Figure 1:
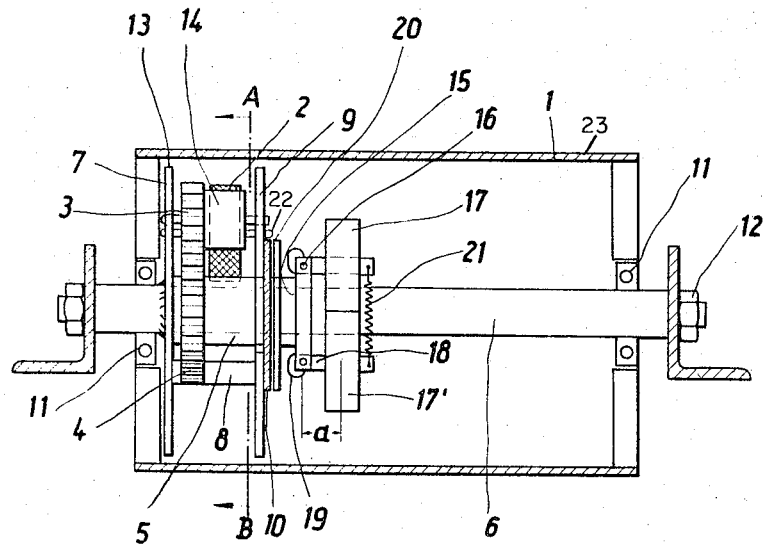

Aug. 15, 1967　　H. HUNDHAUSEN ETAL　　3,335,824
BRAKING ROLLER
Filed March 10, 1965　　2 Sheets-Sheet 1

*Inventors:*
HUGO HUNDHAUSEN &
ANTON AX
BY Owen, Wickersham & Erickson
ATTORNEYS

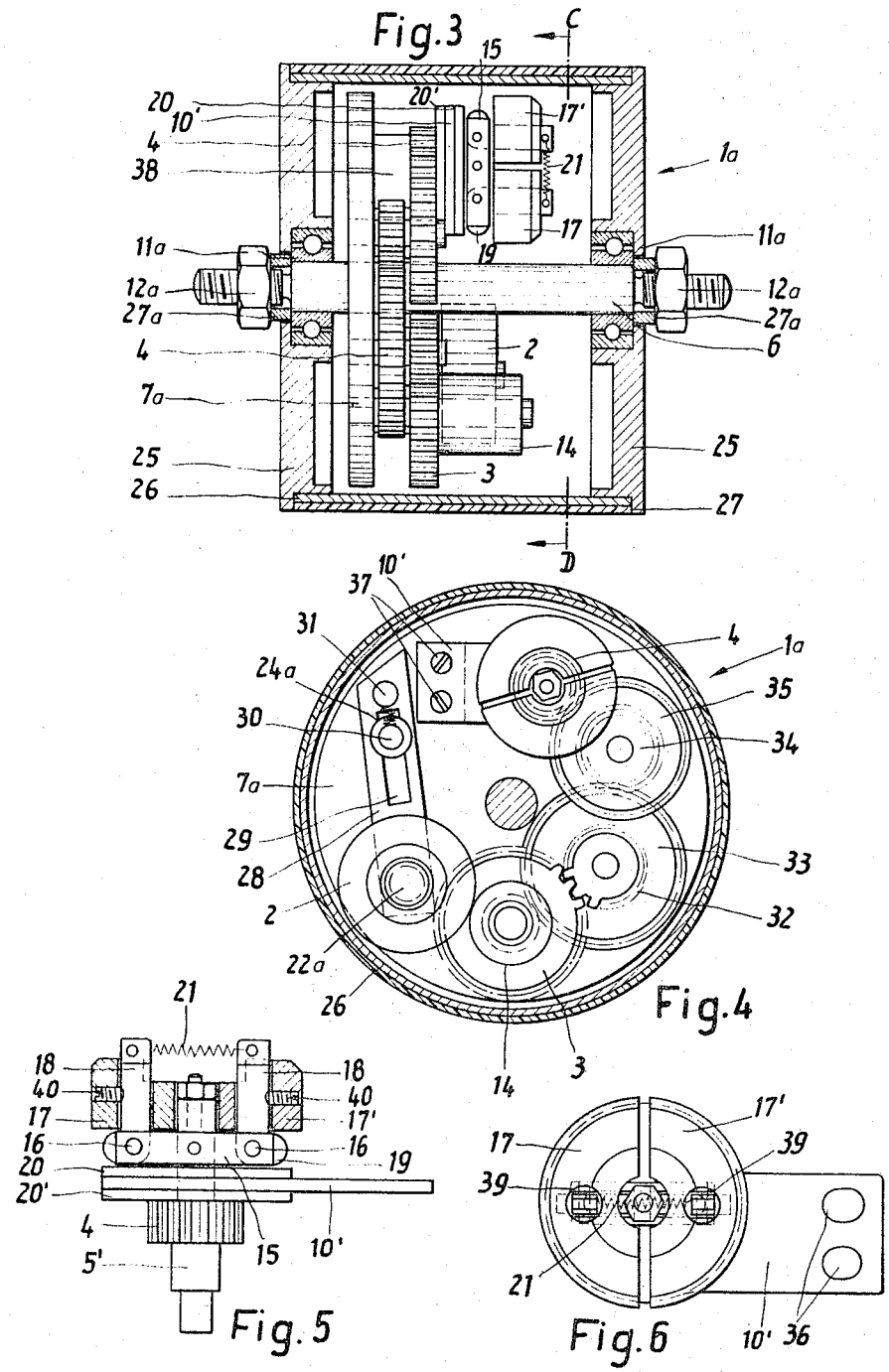

3,335,824
BRAKING ROLLER
Hugo Hundhausen, 11 am Bahnhof, 59 Siegen, Germany,
and Anton Ax, Haus 100, 5901 Gernsdorf, Germany
Filed Mar. 10, 1965, Ser. No. 438,670
Claims priority, application Germany, Apr. 6, 1964,
St 21,932
14 Claims. (Cl. 188—187)

This invention relates to a braking roller, of the type incorporated into a roller track for conveying items such as boxes, parcels and the like.

Braking rollers are used to control the velocity of the items moving on the roller track by exerting on the items moving across them a braking action which is independent of the velocity of the items and results in an initially gentle, but gradually increasing braking, whereas the reaction moments exerted on the items moving across the roller are minimized.

Heretofore, some braking rollers with interior braking mechanisms have controlled the braking force by means of weights, which exerted on the braking mechanism a force that depended on the speed of the roller. Complicated devices were used for transforming the speed of the roller into the higher speeds required for the action of the pendulum weights.

In structures heretofore used, the inside walls of the cylindrical roller formed the braking surfaces, and they had to be machined for this purpose, thereby increasing the manufacturing costs. The inevitable wear which occurred during braking took place in such devices at the most important part of the roller, so that it had to be replaced from time to time.

In some other prior art structures, the rotation of the roller was utilized to drive a liquid pump or a similar apparatus, or the liquid resistance was used to produce the braking action as in liquid couplings.

One object of the present invention is to provide a mechanically acting apparatus, in which the required mechanism is mounted only on the shaft of the roller so that the elongated cylindrical roller itself need not be machined. Corollary objects are to achieve a significant reduction in the manufacturing costs of the braking roller and to simplify its assembly.

Thus, in a braking roller for roller tracks or the like, having a braking mechanism disposed within the roller and exerting action on the roller barrel that depends on the relative speed between the shaft and the barrel, with the aid of pendulum weights, which control the degree of braking action, and a transmission for driving the pendulum weights at a speed which is higher than that of the roller barrel, these objects are accomplished according to the invention by having the transmission and a disc brake (the latter being controlled by the pendulum weights) mounted on the roller shaft to form a unit which rotatably supports the roller and is in frictional engagement with the inside peripheral surface of the roller only by an input wheel of the transmission.

Another object of the invention is to eliminate the need for internal teeth on the roller barrel or for a machined inside surface suitable for engagement by brake shoes, or for an exact centering of the shaft and the mechanism. As a result, the invention provides a simplified structure of the braking roller and greatly reduces assembly costs.

Another object of the invention is to dissipate the braking heat. Previously, the metallic roller shell was used for dissipating the frictional heat generated during braking. It has now been found that the frictional heat generated during the short-time stressing of the braking roller can instead be taken up by a relatively small disc or multiple-disc brake. Experience has shown that the items to be conveyed move on the roller track in substantial intervals and the movement of an item across a braking roller takes only seconds or fractions of a second. For this reason, the braking roller according to the invention has the required service life even when only two brake discs are employed.

Another feature of the invention is that the shaft carries a transmission cage, which is firmly connected to the shaft, and the driven member of the transmission is a friction wheel, which is made of elastic material and has a shaft which is slightly displaceable in circumferential direction relative to the cage and which serves as a bearing carrier. The friction wheel is movable in dependence on the direction of rotation, preferably under the action of a spring, by means of the torque frictionally transmitted from the roller shell, and it acts somewhat like a wedge between the barrel and the transmission member driven by the friction wheel. As a result of this arrangement, the torque transmitted by the friction wheel disposed between the barrel and the succeeding transmission stage increases with the braking force, whereas during a rotation in the opposite direction this friction wheel transmits small, if any, driving forces to the transmission and further to the brake discs controlled by the pendulum weight. This results in a previously unknown mode of operation.

Another advantage in this structure is that a sufficient slip exists between the friction wheel and the roller shell when the movement of the braking roller begins, and this slip decreases progressively only as the braking action increases. This is of great significance because it means that the parts of the transmission and pendulum weights cannot be damaged by sudden accelerations, and the items conveyed across the roller are not suddenly retarded, but are gradually braked. This is particularly important with large items, which might tip over as a result of sudden braking.

A further feature of the invention is that a sleeve mounted on the shaft carries a gear and the pendulum weight or its pivot, and the shaft carries a disc, preferably a polyamide disc which is smooth on the braking side; this disc is axially displaceable along the shaft but is non-rotatably mounted on the shaft.

An additional feature of the invention is that the lever arms which carry the pendulum weights are provided with short angled extensions, which extend from the pivots of the levers and engage the axially displaceable braking disc; the disc is made from a suitable plastic material and has enlarged annular portions or the like, which provide surfaces for engagement by the angled extensions of the pendulum weights.

Another feature of the invention is that the cage mounted in the transmission carries the gears of the transmission and has an inner mounting plate, which carries or constitutes one of the two brake discs.

The rotary motion derived from the barrel is preferably transmitted at a ratio of 1:24 by the transmission to the sleeve, which is rotatably mounted on the shaft and is received by a suitable bore in the mounting plate. The bearings for the pendulum weights are provided at the end of this sleeve. The short, angled extensions or lever arms of these pendulum weights extend toward the transmission and engage the brake disc, which is preferably made from polyamide, and can displace the disc axially toward the mounting plate. The second brake disc is secured to or constituted by the mounting plate, a thin polyamide disc preferably being adhered to the mounting plate. The torque transmitted by the braking mechanism to the mounting plate is thus directly transmitted to the transmission cage that is rigidly connected to the shaft, which is stationary and non-rotatable.

In addition to the frictional slip coupling constituted by the brake discs themselves, a slip coupling is provided between the roller barrel and the friction wheel which the barrel drives. A third slip coupling may be provided by an elastic sleeve, which surrounds the elongated cylindrical braking roller on the outside and enables a certain elastic slippage between the roller and the items being conveyed.

Within the idea underlying the invention, there may be various modifications of the embodiments. For instance, the number of braking discs may be increased, as is known in multiple-disc couplings. Besides, it is also possible to use a brake material other than polyamide, for instance any material used as a brake lining for rope pulleys and the like devices. Such or similar materials resist temperatures up to 500° C. when stressed for a short time. A direct-toothed mesh between teeth on the inside of the roller barrel and an input gear of the transmission or a plurality of elastic friction wheels may be employed. Whereas a transmission having a ratio of 1:24 has given favourable results, other transmission ratios may also be used.

All torsional forces which occur during the braking operation and the axial forces exerted by the lever arms of the carriers of the pendulum weights are taken up by the sleeve mounted on the main shaft or by the transmission cage.

The braking action may be regulated by known means. For instance, the two pendulum weight levers may be connected by a tension spring having an adjustable tension, or the length of the lever arms carrying the weights may be varied. Alternatively, the elastic friction wheel, which has a certain freedom of movement in the circumferential direction, may be constantly urged by spring force into a position providing for an adequate slippage between the friction wheel and the roller barrel or between the friction wheel and the succeeding transmission stage. When the spring force is adjustable, the slip behaviour and with it the braking action can be adjusted.

Other objects and advantages of the invention will appear from the following description of some preferred embodiments.

Figure 2:
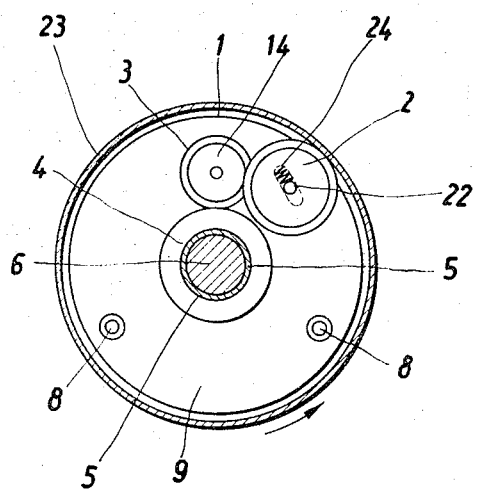

In the drawings:

FIG. 1 is a longitudinal sectional view showing a braking roller embodying the principles of the invention, FIG. 2 is a transverse sectional view taken on line A–B of FIG. 1, FIG. 3 is a longitudinal sectional view showing a modified form of the invention, FIG. 4 is a sectional view taken on line C–D of FIG. 3, FIG. 5 shows a portion of the braking device of FIGS. 3 and 4 partly in section, and FIG. 6 is a top view of the portion of the device shown in FIG. 5.

A braking roller 1 is mounted by bearings 11 on a shaft 6, which is non-rotatably secured as by nuts 12 to a stationary support. A cage 7 fixedly secured to the shaft 6 comprises two mounting plates 13 and 9 connected by cross-bolts 8 to form a unit.

Rotation of the barrel 23 of the roller 1 is transmitted to a friction wheel 2, which may be a rubber-covered roller having a shaft 22. The shaft 22 is mounted in the cage 7 to be displaceable in the circumferential direction against a constantly acting force, which may be supplied by a spring 24, so that the friction wheel 2 is drawn in the direction of rotation of the roller 1 into a wedgelike space between the inside surface of the roller 1 and a smooth cylindrical collar 14 of a pinion 3. The friction wheel 2 then engages the cylindrical, smooth portion 14 to drive the pinion 3, which is in mesh with a gear 4 that is fixedly mounted on a sleeve 5 which is provided at its end with a flange 15. The sleeve 5 extends through a corresponding hole in the mounting plate 9, and a disc 10, which may be of polyamide, is secured to the mounting plate 9 and has a central hole concentric with that of the mounting plate 9.

Pendulum weights 17 and 17' are carried by levers 18, which are rotatably mounted in bearings 16 carried by the flange 15 of the sleeve 5 (compare FIG. 5.) The weights 17 and 17' are adjustable to vary the effective length of the lever arm $a$. Either the two pendulum weights 17, 17' or the two lever arms 18 are connected to each other by an adjustable spring 21, which holds the weights together in the rest position and permits them to move away from the shaft 6 only when a certain speed has been reached. The levers 18 are provided with angled extensions 19, which extend radially outwardly from the bearings 16. This assembly acts as a speed responsive brake governor.

A brake disc 20 is non-rotatably secured on the sleeve 5 and is urged by the extensions 19 against the non-rotatable disc 10 during the braking operation. The brake discs 20 and 10 are preferably quite smooth in order to ensure the required slippage at the beginning of the braking operation. The disc 10 is enlarged in the annular area which is engageable by the extensions 19.

The mode of operation of the apparatus of FIGS. 1 and 2 is as follows:

When, under centrifugal action, the weights 17, 17' move pivotally outwardly away from the shaft 6 about the bearings 16, the lever arms 18 move outwardly and the angled extensions 19 engage the brake disc 20 and urge the disc 20 axially against the disc 10 with a force which varies with the angle of the pivotal movement of the levers 18. Thus the rotation of the sleeve 5 is retarded, and the retarding of the sleeve 5 acts through the gear 4 and the pinion 3 to retard the rotation of the friction wheel 2. Since the friction wheel 2 engages the inside surface of the roller barrel 23, the roller 1 is braked, resulting in a corresponding braking action on items moving across the roller 1. As soon as the speed of the roller 1 and with it the velocity of the item has been reduced to a desired value, which has been predetermined by the adjustment of the device, the pendulum weights 17, 17' are pulled by the spring 21 towards the shaft 6, the extensions 19 of the levers 18 cease to apply pressure to the disc 20, and the braking action is eliminated.

As is apparent from the foregoing description, the structure of the apparatus is very simple and its manufacture does not involve technological difficulties. An important recognition underlying the invention is that braking rollers of this type will be stressed only for short periods of time, and the frequency of the stressed periods is relatively low so that there is a sufficient period for cooling between successive braking operations. This enables the use of simple brake discs for producing the sometimes considerable braking action required when heavy items move across the roller 1.

The embodiment of FIGS. 3 to 6 corresponds to the embodiment of FIGS. 1 and 2 except as to the arrangement of the braking device, which in this case is not supported by the shaft 6 but is separately mounted upon another shaft. This enables the mounting of a greater number of gears of a transmission.

For the parts identical with those of the above described embodiment identical references are provided.

The braking roller 1a as shown in FIG. 3 comprises two lateral circular discs 25 and a cylindrical portion 26 which is covered on the outside by a layer 27 of an elastic material such as rubber, which may be arranged to slip relatively to said portion 26. The roller or drum 1a is rotatably supported on the shaft 6 by means of antifriction bearings 11a. The nuts 12a hold the assembly together, a washer 27a being interposed between each of the nuts and the adjacent bearing 11.

Non-rotatably secured to the shaft 6 is a disc or cage 7a upon which the gears of the transmission are rotatably mounted, as now will be described. In contrast to the embodiment of FIG. 1, the support means 7a for the gears comprises a single disc only.

The disc 7a supports the friction wheel 2, which rotates on its shaft 22. The shaft 22 is supported at one end of an arm 28, which by means of a slot 29 is slidably guided in its longitudinal direction upon a stud 30 so that a degree of pivotal movement is possible.

Between the stud 30 and a further stud 31 fastened at the other end of the arm 29 at the opposite extremity to the one where the friction wheel 2 is held, a traction spring 24a is provided. The spring 24a urges the arm 28 and in consequence the friction wheel 2 to the position shown in FIG. 4.

As can be seen from FIG. 4, the friction wheel 2 contacts the inside wall of the portion 26 of the braking roller 1a and also the smooth part or collar 14 of the pinion 3, which is rotatably supported by the disc 7a. The pinion 3 engages a smaller pinion 32, also rotatably carried on the disc 7a. A third pinion 33 non-rotatably and co-axially connected with the pinion 32 engages an adjacent pinion 34, which in turn is non-rotatably connected to a co-axial pinion 35. The pinion 35 engages the pinion 4 of the braking device. The pinion 4 is non-rotatably connected with a shaft 5' (see FIG. 5) having the flange 15 fastened thereto at the end of the shaft opposite the disc 7a. Between the flange 15 and the pinion 4 are two braking discs 20 and 20' non-rotatably supported by the shaft 5', and between the discs 20 and 20' is a plate 10' which projects laterally and has two holes 36 (FIG. 6) for attachment to a block 38 (FIG. 3) by means of bolts 37 (FIG. 4). The block 38 is itself fastened to the disc 7a.

On the flange 15, the two levers 18 are swingably mounted in the bearings 16, the outward ends of the levers 18 being held together by the spring 21. The levers 18 are provided with the angled extensions 19, and each of the levers 18 carries a pendulum weight 17 or 17', each having a semicircular shape and a vertical bore 39 which receives the corresponding lever 18. The pendulum weights 17 and 17' are adjustably fastened by means of screws 40 engaging lateral threaded bores and contacting the levers 18 with their inside ends.

The operation of device shown in FIGS. 3 to 6 corresponds to that of the device shown in FIG. 1, in that the braking action is effected by the pressure as caused by the pivoting of the pendulum weights 17 and 17' and transferred by the extensions 19 on the levers 18 to the braking disc 20. The braking disc 20 is firmly held against the plate 10' which is mounted upon the disc 7a. The second braking disc 20' on the opposite side of the plate 10', being non-rotatably mounted on the shaft 5', improves the braking action. When the discs 20 and 20' are pressed against the plate 10' the rotational movement of the shaft 5' is slowed down. This slowing down is transferred by the train of pinions 3, 32, 33, 34, 35, and 4 to the friction wheel 2 which brakes the roller 1.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What we claim is:

1. A braking roller for roller tracks or the like, of the type having a roller with a barrel supported for rotation around a shaft, a braking mechanism disposed within the roller and exerting a speed-dependent braking action on the roller barrel in dependence on the relative speed between the shaft and the barrel, said mechanism including pendulum weights for controlling the amplitude of the braking action and a transmission, having an input wheel, for driving the pendulum weights at a speed which is higher than that of the roller barrel, characterized by said transmission being mounted on said shaft, a disc brake mounted on said shaft and controlled by said pendulum weights, said shaft, transmission and disc brake forming a unit, which rotatably mounts the roller and is in frictional engagement with the inside peripheral surface of the roller only by an input wheel of the transmission.

2. A braking roller as claimed in claim 1 having a transmission cage rigidly connected to the shaft, said input wheel comprising a friction wheel made of elastic material and having a shaft which is slightly displaceable in circumferential direction relative to the cage, said cage serving as a bearing carrier, so that the friction wheel is movable in dependence on the direction of rotation of the barrel by means of the torque frictionally transmitted from the barrel.

3. The braking roller of claim 2 wherein a spring is secured to the shaft of said friction wheel to resist its movement.

4. A braking roller as claimed in claim 1 wherein a sleeve is mounted on said shaft and carries a gear, said pendulum weight and said shaft carrying a brake disc axially displaceably and non-rotatably mounted on said shaft.

5. The braking roller of claim 4 wherein said disc is polyamide and is smooth on the braking side.

6. A braking roller as claimed in claim 4 in which lever arms carry the pendulum weights and have pivots provided with short angled extensions which engage said axially displaceable braking disc.

7. A braking roller as claimed in claim 6, characterized in that the axially displaceable brake disc is of polyamide and has enlarged annular portions which provide surfaces for engagement by the angled extensions.

8. A braking roller for roller tracks, comprising
a main shaft,
a roller rotatably mounted on said main shaft and having a cylindrical portion, and
a braking mechanism disposed within the roller and supported by said main shaft for exerting a speed-dependent braking action on the roller in dependence on the relative speed between the shaft and the roller, said braking mechanism including
a transmission cage rigidly connected to the shaft,
a transmission supported by said cage and having an auxiliary shaft yieldingly supported by said cage for a small degree of displacement in circumferential direction relative to the cage, an input friction wheel mounted rotatably upon said auxiliary shaft in engagement with said cylindrical portion of said roller, so that the friction wheel is movable in dependence on the direction of rotation by means of the torque frictionally transmitted from the said cylindrical portion, a transmission gear train driven by said friction wheel, and a first brake disc rotated by said train,
an inertia pendulum device mounted for rotation relative to said main shaft and driven by said transmission at a speed which is higher than that of said roller, and
a second brake disc mounted against rotation relative to said main shaft and moved axially toward said first brake disc by said inertia device as the speed of said inertia device increases so that said inertia device controls the amount of braking action exerted on said transmission in accordance with the speed of said transmission.

9. The device of claim 8 wherein said brake discs are of polyamide and are smooth on their braking surfaces.

10. A braking roller for roller tracks, comprising
a stationary main shaft,
a roller rotatably mounted on said main shaft and having a cylindrical portion with an external surface and an internal surface,
a transmission cage inside said roller and rigidly connected to the shaft, an auxiliary shaft yieldingly supported by said cage inside said roller for a small degree of displacement in circumferential direction relative to said cage, an input friction wheel mounted rotatably on said auxiliary shaft in engagement with the interior surface of said cylindrical portion of said roller, so that said friction wheel is movable in dependence on the direction of rotation, by means of the torque frictionally transmitted from the said cylindrical portion, transmission gears inside said roller supported by said cage and driven by said friction wheel, a first brake disc carried by one said gear, a speed-responsive brake governor in said roller mounted for rotation with respect to said main shaft and driven by one said gear at a speed which is higher than that of said roller, and a second brake disc mounted in said roller and secured against rotation relative to said main shaft and axially movable with respect thereto toward and away from said first brake disc, so that said governor controls the amount of braking action exerted on said roller through said transmission in accordance with the speed of said transmission as determined by said roller in accordance with objects moving over the outer surface thereof, a frictional slip coupling being provided by the brake discs themselves and an additional slip coupling being provided between the cylindrical portion of the roller and the friction wheel.

11. A braking roller as claimed in claim 10 having a sleeve surrounding said cylindrical portion and rotatable relative thereto against friction and serving as a third slip coupling.

12. A braking roller as claimed in claim 10 wherein the governor is mounted on said main shaft and so is said second brake disc.

13. A braking roller as claimed in claim 10 wherein said governor and said second brake disc are mounted on a shaft carried by said cage and are rotatable thereon.

14. A braking roller as claimed in claim 10 wherein said governor comprises lever arms with pivots, pendulum weights carried by said arms and provided with short angled extensions, which extend from the pivots of said levers and engage said second brake disc, said second brake disc having enlarged annular portions with surfaces for engagement by said angled extensions.

References Cited

UNITED STATES PATENTS

| 2,362,676 | 11/1944 | Stechbart | 188—187 |
| 2,477,102 | 7/1949 | Trevitt | 188—187 |
| 3,180,472 | 4/1965 | Isacsson | 188—180 X |

DUANE A. REGER, *Primary Examiner.*